United States Patent
Evans

(10) Patent No.: US 8,029,231 B2
(45) Date of Patent: Oct. 4, 2011

(54) FAN TRACK LINER ASSEMBLY

(75) Inventor: Dale E. Evans, Derby (GB)

(73) Assignee: Rolls-Royce PLC, London (GB)

( * ) Notice: Subject to any disclaimer, the term of this patent is extended or adjusted under 35 U.S.C. 154(b) by 487 days.

(21) Appl. No.: 12/320,561

(22) Filed: Jan. 29, 2009

(65) Prior Publication Data

US 2009/0214327 A1    Aug. 27, 2009

(30) Foreign Application Priority Data

Feb. 27, 2008   (GB) .................................. 0803479.5

(51) Int. Cl.
    *F01B 25/16*    (2006.01)
(52) U.S. Cl. ............................................................ 415/9
(58) Field of Classification Search .............. 415/9, 200, 415/173.4
    See application file for complete search history.

(56) References Cited

U.S. PATENT DOCUMENTS

| 4,534,698 | A |   | 8/1985 | Tomich |
| 5,336,044 | A |   | 8/1994 | Forrester |
| 5,344,280 | A | * | 9/1994 | Langenbrunner et al. ........ 415/9 |
| 6,619,913 | B2 |   | 9/2003 | Czachor et al. |
| 7,914,251 | B2 | * | 3/2011 | Pool et al. .......................... 415/9 |
| 2007/0297910 | A1 | * | 12/2007 | Pool et al. ........................ 416/224 |

FOREIGN PATENT DOCUMENTS

| DE | 10 2006 036 648 A1 | 2/2008 |
| EP | 0 626 502 A1 | 11/1994 |
| GB | 2 426 287 A | 11/2006 |

* cited by examiner

*Primary Examiner* — Gary F. Paumen
(74) *Attorney, Agent, or Firm* — Oliff & Berridge PLC

(57) ABSTRACT

A fan track liner within a rotor blade assembly for a gas turbine engine comprises a radially inner casing liner member and a radially outer casing liner member adjacent to the radially inner casing liner member. A septum is interposed between the radially inner and radially outer casing liner members and bonds together the radially inner and radially outer casing liner members. The septum includes predetermined weakened regions which permit penetration of the septum in use by a rotor blade in the event of impact of the radially inner casing liner member by a detached rotor blade. Assembly otherwise capable of resisting ice shed from the blade impacting the same region.

13 Claims, 3 Drawing Sheets

FAN TRACK LINER ASSEMBLY

The present invention relates to a fan track liner assembly for a gas turbine engine, and in particular but not exclusively to a fan track liner assembly for a gas turbine engine.

Ice can form on the rotor blades of a gas turbine engine during engine operation, and in particular on the fan blades. Due to the high centrifugal forces that are encountered during engine operation, the ice can shed from the blades. Gas turbine engines conventionally include a fan case with acoustic panels and fan track liners that are vulnerable to damage when ice is shed during engine operation.

Rotor blades can become detached during engine operation, and the fan case also needs to cater for blade impact in the event of blade detachment. The fan case is a rotor blade containment assembly.

The characteristics of the containment assembly that are needed to cope with ice impact and rotor blade impact are somewhat different. In the case of ice impact, it is preferred that the containment assembly has high toughness to substantially prevent any penetration of the ice into the containment assembly such that panels and liners retain functionality for noise and efficiency. In the case of rotor blade impact, it is preferred that the containment assembly has lower toughness to allow partial penetration of a detached rotor blade into the containment assembly. This partial penetration is necessary in particular to ensure effective containment of a fan blade in the event of fan blade detachment.

With conventional fan blade configurations, the ice impact and fan blade impact regions have typically been spaced apart axially through the gas turbine engine, with the ice impact region being downstream or aft of the fan blade impact region. It has thus been possible to vary the structure of the fan blade containment assembly in these different regions to provide the different characteristics that are needed to cope with ice impact and fan blade impact. However, some newly developed fan blade configurations have resulted in ice impact and fan blade impact occurring in the same region. This has led to difficulties with fan blade containment in the event of fan blade detachment.

Accordingly, the present invention seeks to provide an improved fan track liner containment assembly for a gas turbine engine.

According to a first aspect of the present invention, there is provided a fan track liner assembly for a gas turbine engine, the assembly comprising a radially inner casing liner member, a radially outer casing liner member adjacent to the radially inner casing liner member, a septum interposed between the radially inner and radially outer casing liner members which bonds together the radially inner and radially outer casing liner members, characterised in that the septum includes predetermined weakened regions which permit penetration of the septum in use by a detached rotor blade.

Where the terms radial, axial and circumferential are used in this specification in relation to the fan track liner assembly or associated components, they refer to orientation with respect to the engine axis (see X-X in FIG. 1) of a gas turbine engine. Thus, the radial direction is outwardly away from the engine axis, the circumferential direction is transverse to the radial direction, in the direction of rotation of a blade, and the axial direction is along the engine axis, perpendicular to the circumferential direction.

The predetermined weakened regions may be arranged so that they correspond to the typical impact footprint of a detached rotor blade. Thus, in the event of impact against and penetration of the radially inner casing liner member by a detached rotor blade, the detached rotor blade may pass through the septum and penetrate the radially outer casing liner member.

The predetermined weakened regions may comprise lines of weakness. The predetermined weakened regions may comprise incisions. The incisions may extend at least partially through the septum.

In some embodiments, the incisions may extend fully through the septum. In such embodiments, the septum may comprise a plurality of septum portions. The plurality of septum portions may be interconnected, for example they may be interwoven. The interconnection between the septum portions may be provided by stitching.

The septum may comprise one or more layers of fibre reinforced composite material, and the or each layer may include said predetermined weakened regions.

The radially inner and radially outer casing liner members may have a cellular structure. The density of the cellular structure of the radially inner casing liner member may be greater than the density of the cellular structure of the radially outer casing liner member. The cellular structure of the radially inner casing liner member may be filled with abradable filler.

According to a second aspect of the present invention, there is provided a gas turbine engine including a fan track liner assembly according to the first aspect of the present invention Embodiments of the present invention will now be described by way of example only, and with reference to the accompanying drawings, in which.

Figure 1:
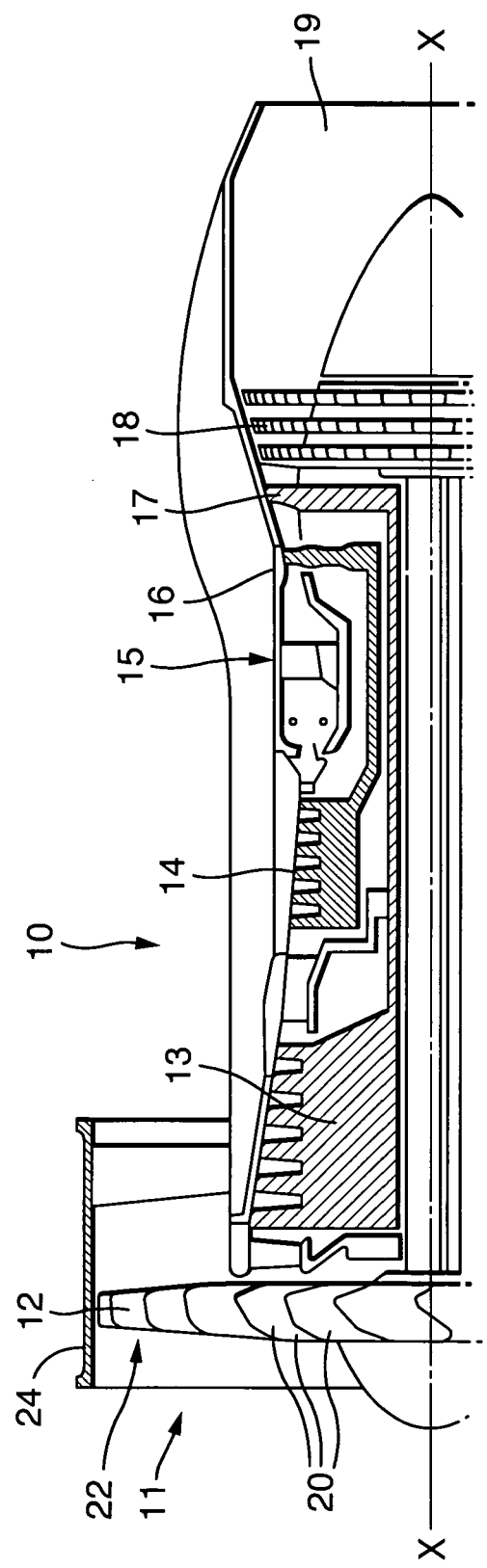
FIG. 1 is a diagrammatic cross-sectional view of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produces two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13, and the fan 12 by suitable interconnecting shafts.

The propulsive fan 12 comprises a plurality of circumferentially spaced fan blades 20 which are mounted on, and extend radially outwardly from, a fan rotor. The fan blades 20 rotate in use about engine axis X-X. The propulsive fan 12 is located in a fan duct 22 defined at least in part by a circumferentially extending fan casing 24. The fan casing 24 includes a fan track liner assembly 26, which will now be described in more detail with reference to FIGS. 2 to 4. Fan blades lightly abrade the liner to set a tight tip clearance for fan efficiency. The casing 24 carries the liner parts and contains any released fan blade parts or particles.

Figure 2:
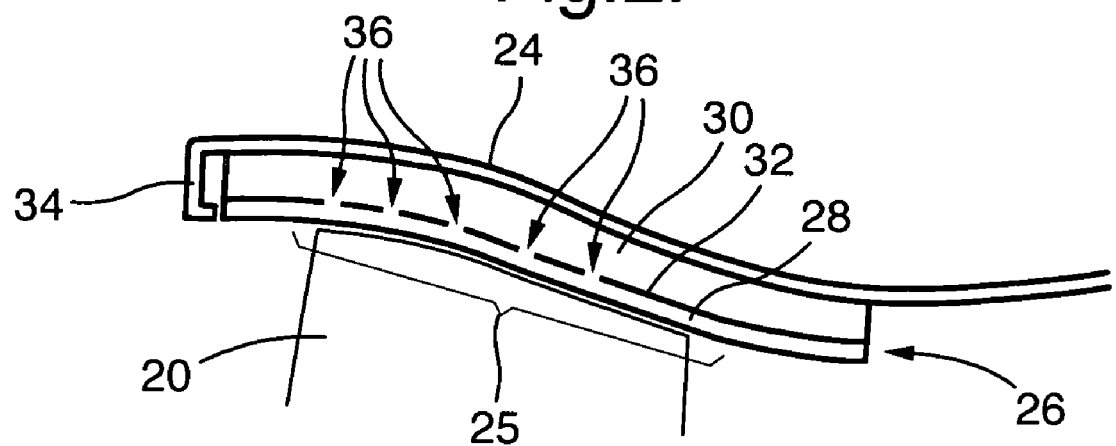
FIG. 2 is a diagrammatic cross-sectional view of a fan track liner assembly.

Referring initially to FIG. 2, the fan track liner assembly 26 comprises radially inner and radially outer casing liner members 28, 30 which are arranged adjacent to each other. In some embodiments, the thickness of the radially outer casing liner member 30 is greater than the thickness of the radially inner casing liner member 28.

The radially inner casing liner member 28 comprises a high density cellular structure, for example a high density honeycomb structure. This high density honeycomb structure may, for example, comprise a Nomex® aramid fibre honeycomb structure. In some embodiments, the high density honeycomb structure is filled with abradable filler, and this filler may comprise hollow microspheres in an epoxy paste. Other suitable fillers can, of course, be employed. In use, the filler provides an abradable air washed surface for the tip of the fan blades 20.

The radially outer casing liner member 30 also comprises a cellular structure, for example a honeycomb structure, but of lower density than the cellular structure of the radially inner casing liner member 28. The low density honeycomb structure may typically comprise an aluminium honeycomb, a titanium honeycomb, a composite material honeycomb, a resin impregnated paper honeycomb or another suitable honeycomb.

In order to adhere the adjacent radially inner and radially outer casing liner members 28, 30 together, a septum 32 is interposed between the radially inner and radially outer casing liner members 28, 30. The septum 32 typically comprises a layer of fibre reinforced composite material, such as glass fibre reinforced composite material, and its respective surfaces are bonded to the adjacent surfaces of the radially inner and radially outer casing liner members 28, 30, thereby bonding together the radially inner and radially outer casing liner members 28, 30.

With developments in rotor blade, and in particular fan blade, geometry, as indicated above both ice and fan blade impacts can now occur in the same region of the fan casing 24, namely an impact region 25 which is located substantially adjacent to the tips of the fan blades 20. The characteristics of the assembly 26 therefore need to be such that any ice shed from the blades 20 during engine operation is prevented from substantially penetrating the assembly 26 in the impact region 25 but such that a detached blade 20 is allowed to penetrate the assembly 26 in the impact region 25.

As illustrated in FIG. 2, the fan casing 24 includes a fan blade containment formation 34 at an upstream end thereof which is configured to prevent movement of a detached fan blade 20 in an upstream direction, and thereby constrain the detached fan blade 20 to prevent release through the intake which may cause a hazard to the aircraft. The fan blade containment formation 34 is only capable of constraining a detached fan blade 20 if the detached fan blade 20 has penetrated into the assembly 26, to a depth typically radially outwardly of the septum 32 and into the radially outer casing liner member 30.

In accordance with embodiments of the present invention, the septum 32 includes predetermined weakened regions 36. The weakened regions 36 are arranged across the septum 32 so that the septum 32 is sufficiently tough to prevent penetration of ice through the septum 32 in the event of ice being shed from the blades and impacting the assembly 26 in the impact region 25, but so that it is capable of rupturing and thus of allowing penetration of a detached fan blade 20 therethrough into the radially outer casing liner member 30, so that the detached fan blade 20 can be adequately constrained by the fan blade containment formation 34.

Figure 3:
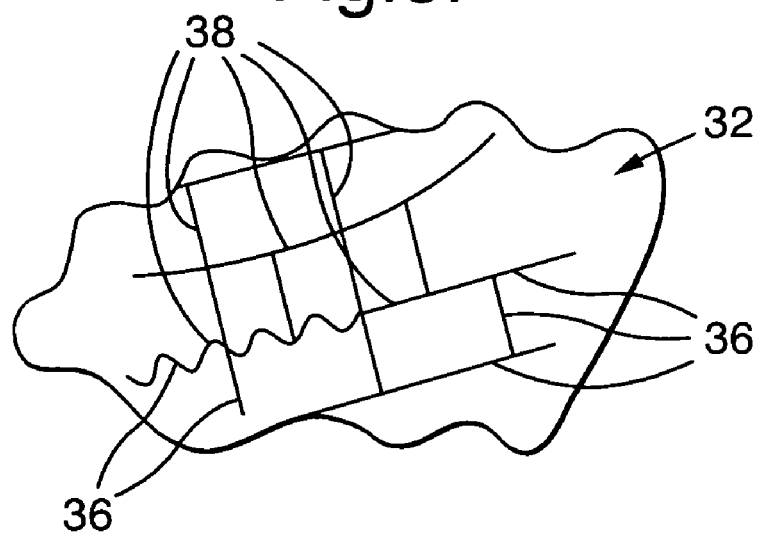
FIG. 3 is a diagrammatic plan view of part of one embodiment of a septum of the fan track liner assembly.

In one embodiment, part of which is illustrated in FIG. 3, the septum 32 is a continuous layer of glass fibre reinforced composite material and the predetermined weakened regions 36 are in the form of lines of weakness 38. These lines of weakness 38 may be pre-cut lines of weakness, for example in the form of incisions which extend partially through the septum 32.

The lines of weakness 38 are configured and arranged across the septum 32 so that they correspond to the typical impact footprint of a detached fan blade 20, as determined for example by the sharper tip of a detached fan blade 20, against the assembly 26, thus ensuring that a detached fan blade can penetrate through the septum 32 and into the radially outer liner member 30. Due to the different impact footprint associated with ice shed from the fan blades 20 during normal engine operation, the lines of weakness 38 do not permit the shed ice to penetrate septum 32 in the impact region 25.

As illustrated in FIG. 3, the lines of weakness 38 may be curved to reflect the actual contact path of a blade tip following blade detachment. The lines of weakness 38 may also be of wavy or undulating formation to further differentiate blade and ice impact results.

Figure 4:
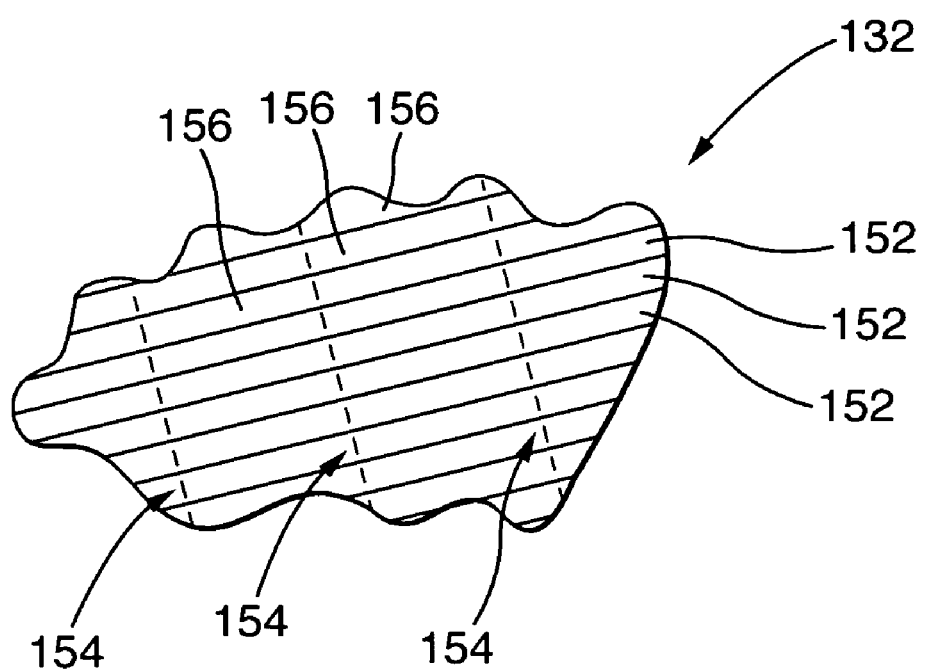
FIG. 4 is a diagrammatic plan view of part of an alternative embodiment of a septum of the fan track liner assembly.

FIG. 4 illustrates an alternative embodiment of the invention. In this embodiment, the septum 132 comprises a plurality of septum portions 152. Each septum portion 152 comprises a pre-cut strip of unidirectional composite material, which typically includes a small number of cross fibres for handling purposes during manufacture. Stitching 154, perpendicular to the septum portions 152, ties the septum portions 152 together to form the septum 132.

In this embodiment, the gaps 156 between the septum portions 152 provide the weakened regions of the septum 132.

There is thus provided an improved fan track liner assembly for a gas turbine engine which is capable of providing appropriate containment of impacts from both shed ice and detached blades in the same region of the containment assembly.

Although embodiments of the invention have been described in the preceding paragraphs with reference to various examples, it should be appreciated that various modifications to the examples given may be made without departing from the scope of the present invention, as claimed. For example, the predetermined weakened regions 36, 140 may be provided by any means and may be of any suitable shape and/or configuration. The septum 32, 132 may be formed of any suitable material, as may the radially inner and/or radially outer casing liner members 28, 30. The containment assembly may be used to contact any detached rotor blades, and is not limited to containing detached fan blades.

I claim:

1. A fan track liner assembly for a gas turbine engine, the assembly comprising a radially inner casing liner member, a radially outer casing liner member adjacent to the radially inner casing liner member, a septum interposed between the radially inner and radially outer casing liner members which bonds together the radially inner and radially outer casing liner members, wherein the septum includes predetermined weakened regions which permit penetration of the septum in use by a detached rotor blade.

2. A fan track liner assembly according to claim 1, wherein the predetermined weakened regions comprise lines of weakness.

3. A fan track liner assembly according to claim 1, wherein the predetermined weakened regions comprise incisions.

4. A fan track liner assembly according to claim 3, wherein the incisions extend at least partially through the septum.

5. A fan track liner assembly according to claim 3, wherein the incisions extend fully through the septum to define a plurality of septum portions.

6. A fan track liner assembly according to claim 1, wherein the septum comprises a plurality of septum portions and the predetermined weakened regions are defined by the gaps between the septum portions.

7. A fan track liner assembly according to claim 5, wherein the plurality of septum portions are interconnected.

8. A fan track liner assembly according to claim 7, wherein the interconnection of the septum portions is provided by stitching.

9. A fan track liner assembly according to claim 1, wherein the septum comprises one or more layers of fibre reinforced composite material, the or each layer including said predetermined weakened regions.

10. A fan track liner assembly according to claim 1, wherein the radially inner and radially outer casing liner members have a cellular structure.

11. A fan track liner assembly according to claim 10, wherein the density of the cellular structure of the radially inner casing liner member is greater than the density of the cellular structure of the radially outer casing liner member.

12. A fan track liner assembly according to claim 10, wherein the cellular structure of the radially inner casing liner member is filled with an abradable filler.

13. A gas turbine engine including a fan track liner assembly according to claim 1.

* * * * *